United States Patent [19]

Stewart

[11] Patent Number: 4,662,099
[45] Date of Patent: May 5, 1987

[54] ICE FREE TIP UP SYSTEM

[76] Inventor: Otis J. Stewart, Star Rte., Box 266, Land O'Lakes, Wis. 54540

[21] Appl. No.: 775,260

[22] Filed: Sep. 12, 1985

[51] Int. Cl.⁴ ............................................. A01K 97/12
[52] U.S. Cl. .......................................... 43/17; 43/19.2
[58] Field of Search .......................... 43/4, 17, 16, 19.2

[56] References Cited

U.S. PATENT DOCUMENTS

| | | | |
|---|---|---|---|
| 2,838,196 | 6/1958 | Chapman | 43/4 |
| 3,171,401 | 3/1965 | Skog | 43/4 |
| 3,196,570 | 7/1965 | Borisch. | |
| 3,387,401 | 6/1968 | Stelmach | 43/17 |
| 3,466,781 | 9/1969 | Nelson | 43/4 |
| 3,545,118 | 12/1970 | Stelmach | 43/17 |
| 3,599,369 | 8/1971 | Carlson. | |
| 3,729,849 | 5/1973 | Richard. | |
| 4,270,297 | 6/1981 | Yates. | |
| 4,373,287 | 2/1983 | Grahl | 43/17 |

Primary Examiner—Nicholas P. Godici
Assistant Examiner—Karen Skillman
Attorney, Agent, or Firm—Kinney & Lange

[57] ABSTRACT

The present invention provides a tip-up system for ice fishing which incorporates a heated housing for preventing ice fishing hole freezer over, means for imparting motion to bait secured to a fish line carried by a fishing pole, and a signal-flag, tip-up arrangement carried by the fishing pole.

10 Claims, 7 Drawing Figures

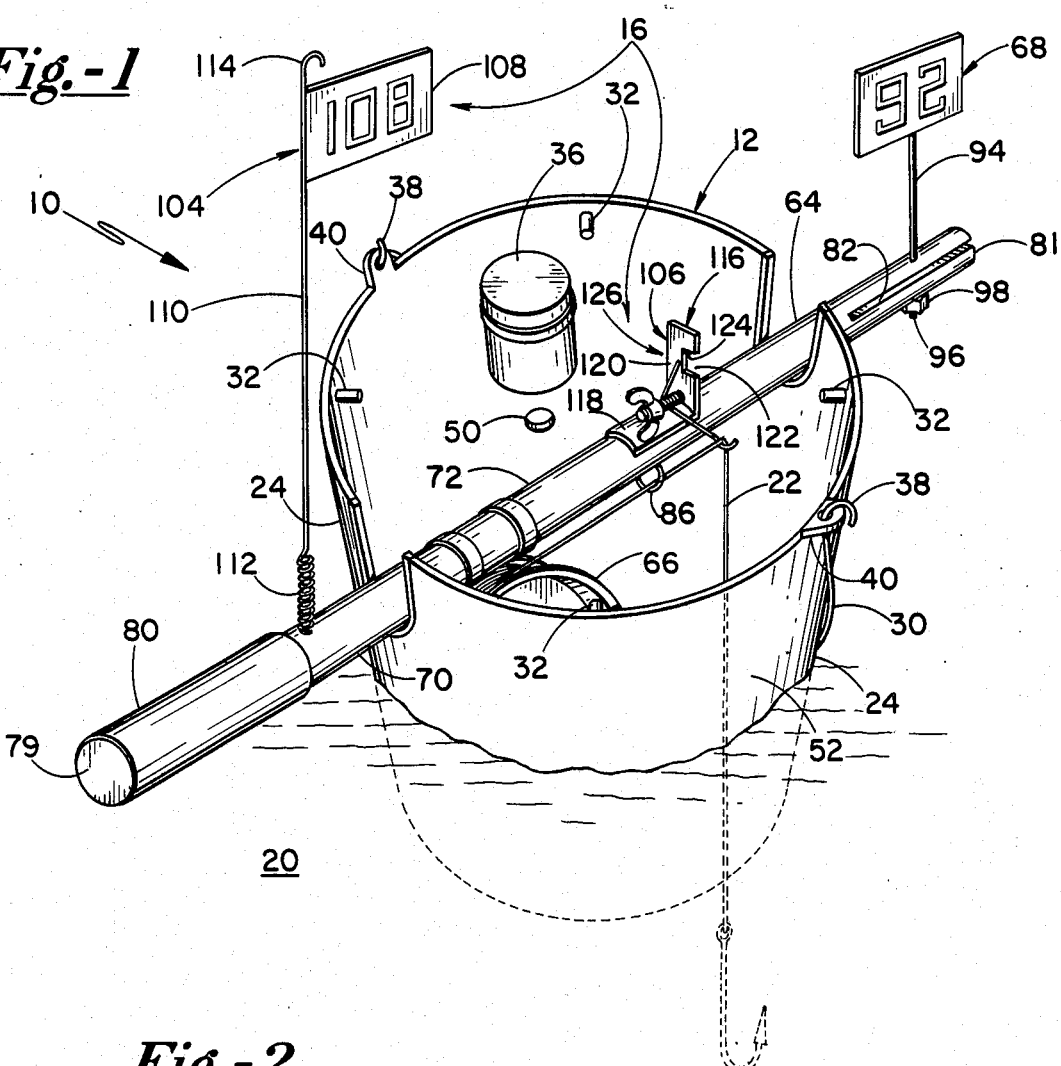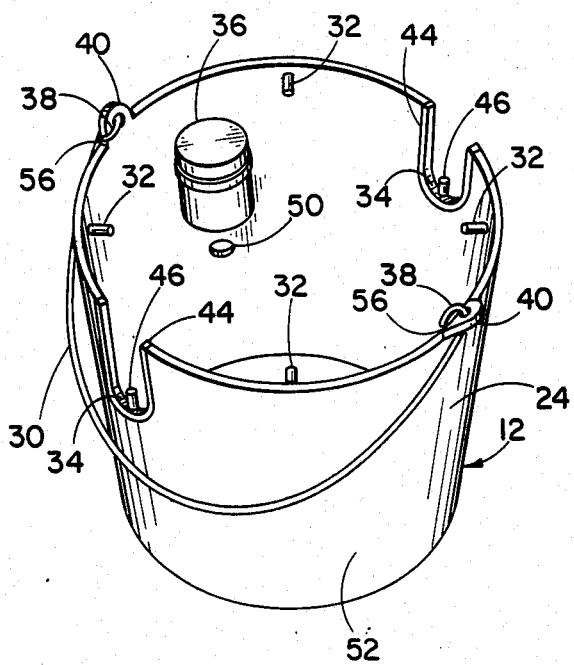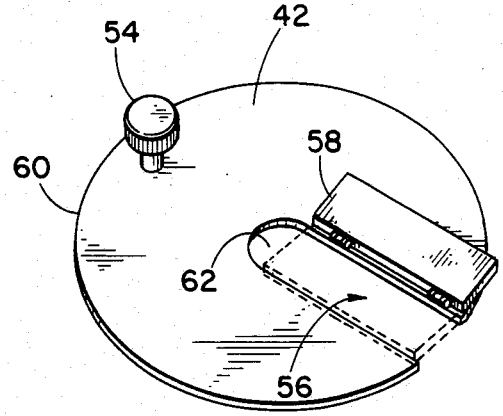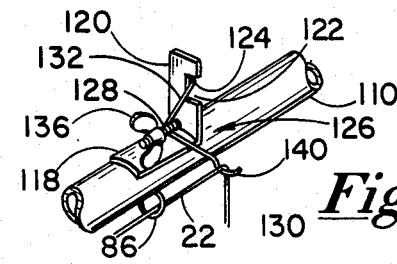

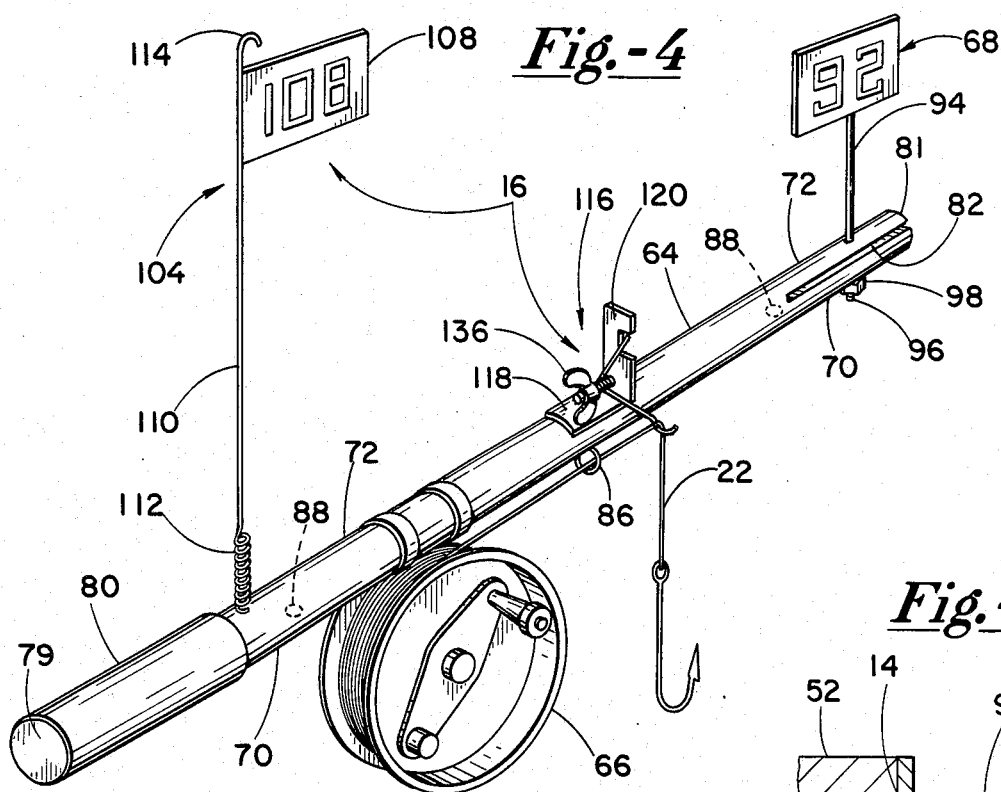
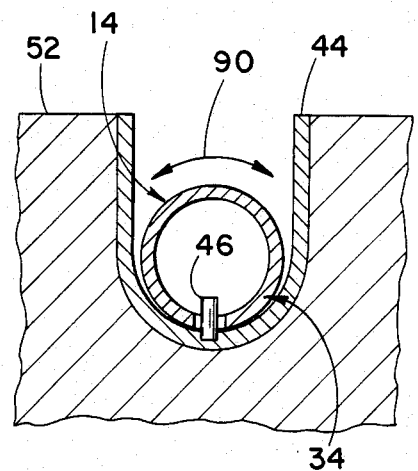
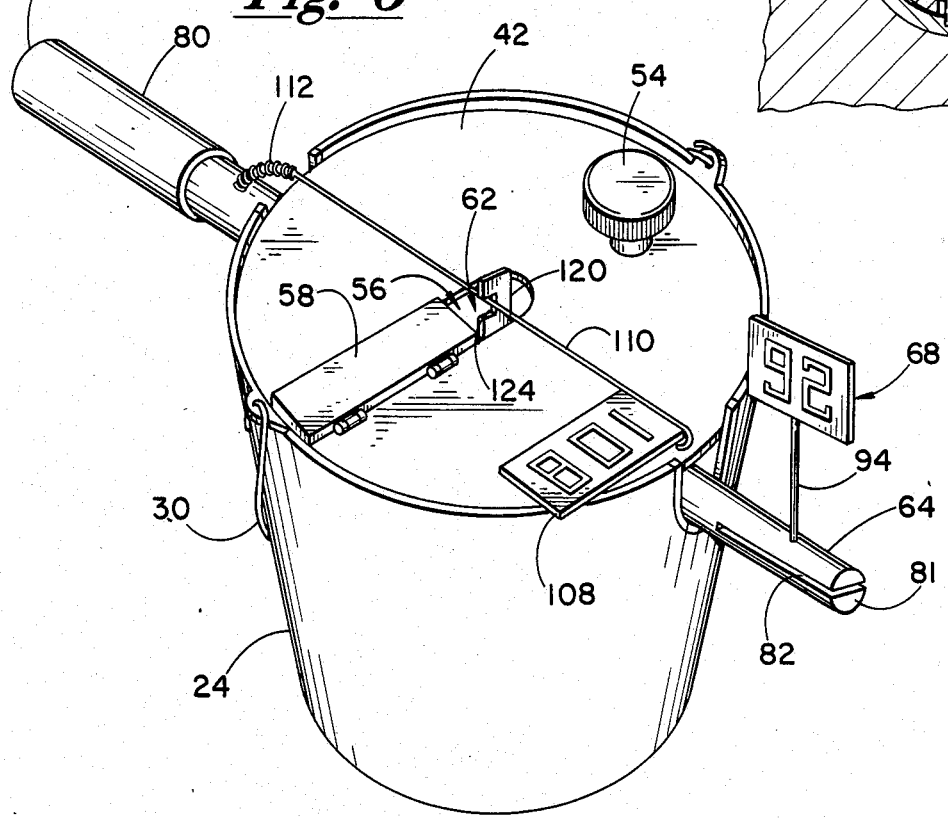

ICE FREE TIP UP SYSTEM

BACKGROUND OF THE INVENTION

1. Field of the Invention

Typical prior art ice fishing tip-up systems include a fishing line, a trigger and a signal such as a flag which is released in response to a fish tugging on the line. Representative of such systems are those shown in U.S. Pat. Nos. 4,079,537 to Chretien; 4,270,297 to Yates; 3,599,369 to Carlson; and 3,196,570 to Borisch. These ice fishing tip-up systems permit fishermen to remotely monitor their fishing lines, from a shelter such as a heated automobile, for example.

A similar ice fishing apparatus is described in U.S. Pat. No. 3,729,849 to Richard and includes a pole supporting a fishing line with the pole being pivotally mounted on a support post. A fish tugging on the line causes the pole to oscillate on the post, visually signaling the biting of the fish.

A problem common to all of the above ice fishing systems is the tendency of the fishing hole to freeze over, requiring periodic cleaning of the fishing hole to keep it open. When the fishing hole is unattended, a status promoted by the use of a tip-up system, the freeze-up problem is compounded. In any event, cleaning the hole is a nuisance and frequently results in a disturbance of the fishing line, sometimes at inopportune moments.

Fishing hole freeze over has been addressed in the prior art. For example, some tip-up systems have incorporated a heater. Examples of such arrangements are shown in U.S. Pat. Nos. 4,253,262 to Johnson; 3,545,118 to Stelmach; and 3,387,401 to Stelmach.

The ice fishing devices of both Stelmach patents noted above describe the use of housings filled with a combustible material, which housings are supported above a fishing hole to direct heat into the hole to prevent the hole from freezing over. Both Stelmach fishing devices are bulky, difficult to set up, and require constant monitoring of the combustible material to assure a continuous flow of heat into the fishing hole.

The ice fishing tip-up of the Johnson patent, also noted above, includes a housing filled with a combustible material, which housing is arranged to float on the water within a fishing hole. As with the Stelmach fishing devices, the combustible material contained in the Johnson housing must be constantly monitored to assure a continuous source of heat, cannot be readily and repeatedly ignited and extinguished, and leaves an ash residue. Also, a reel carried by the Johnson fishing device is disposed within the water below the ice, and is subject to freezing.

The tip-up ice fishing systems of Johnson and Carlson, noted above, further describe wind actuated devices for imparting motion to the fishing line. The Carlson ice fishing tip-up imparts motion to the line through an intricate wind driven motor/linkage system while the Johnson ice fishing tip-up has a wind vane secured to the tip-up which rocks the entire tip-up system as it floats within the fishing hole. Such motion imparting devices may be desirable in combination with a tip-up system, particularly when further combined with an efficient heating system that maintains the fishing hole open.

SUMMARY OF THE INVENTION

The present invention provides a tip-up system for ice fishing having a heater for preventing the fishing hole from freezing over, a device for imparting motion to bait secured to a fishing line carried by the tip-up system and a tip-up signal flag for indicating the presence of a fish biting at the fish line.

The heater/tip-up system of the present invention includes a tapered tubular housing having an open top and an open bottom. The cross sectional dimension of the housing top is greater than the desired cross sectional dimension of a fishing hole in which it is to be positioned while its bottom dimension is smaller. A self-contained heater is secured to an inner wall of the housing to direct heat into the fishing hole. The housing is further arranged to support a fishing pole over the fishing hole.

A preferred fishing pole in accordance with the present invention includes a rod, a reel carrying a fishing line, a signal flag, a trigger mechanism and a wind vane. The signal flag is flexibly coupled at one end to the rod and is movable between a normally extended position and a bent position. The trigger mechansim holds the signal flag in its bent position until a predetermined force is applied on the fishing line which trips the trigger mechanism. Once the trigger mechanism is tripped, the signal flag is released and returns to its normally extended position, indicating the action of a fish biting at the line.

The rod is mounted on the housing in a manner permitting it to be rocked side to side with respect to the housing. The wind vane is secured to the rod and, under the action of wind currents, rocks the fishing rod to impart motion to the fish line.

BRIEF DESCRIPTION OF THE DRAWINGS

FIG. 1 is a perspective view of a preferred embodiment of an ice fishing tip-up system in accordance with the present invention, including a heated housing with the cover removed for clarity and a fishing pole mounted on the housing;

FIG. 2 is a perspective view of the housing of FIG. 1, again with its cover removed;

FIG. 3 is a persective view of a preferred cover for the housing of FIGS. 1 and 2;

FIG. 4 is a perspective view of a preferred embodiment of a fishing pole in accordance with the present invention illustrating a signal flag carried by the fishing pole in a signaling position;

FIG. 5 is a cross sectional view taken along line 5—5 of FIG. 1;

FIG. 6 is a perspective view of the tip-up system illustrated in FIG. 1, with the housing cover closing the top of the housing and the signal flag in a bent or cocked position; and FIG. 7 is an enlarged perspective view of a trigger mechanism forming part of the preferred fishing pole embodiment of FIG. 4.

DETAILED DESCRIPTION OF THE PREFERRED EMBODIMENTS

A portable tip-up ice fishing system in accordance with the present invention is generally indicated at 10 in FIG. 1 and includes a heated housing 12 and a fishing pole 14 carrying a tip-up flag system 16. A cover for the housing 12 is omitted from FIGS. 1 and 2 for the sake of clarity but is described below. The housing 12 supports the fishing pole 14 in a horizontal position over a fishing hole cut through a layer of ice 20 overlying a body of water (not shown), so that a fishing line 22 carried by the fishing pole 14 can be lowered into the fishing hole through the housing 12. A tip-up flag system 16 indicates the presence of a fish biting at bait secured to the fishing line 22.

The housing 12 has a tapered, tubular side wall 24 having an open top and an open bottom. The housing 12 narrows in cross sectional dimension from its top to its bottom. Because of its taper, the housing 12 is self supported within a fish hole having a cross sectional dimension greater than the cross sectional dimension of the bottom of the housing 12, and smaller than the cross sectional dimension of the top of the housing 12, as shown in FIG. 1. That is, the outer diameter or dimension of the top of the housing 12 is greater than the desired dimension of the hole with which it is adapted to cooperate while the bottom outside diameter or dimension is smaller.

The housing 12 includes a handle 30, cover support pegs 32, fishing pole supports 34 and a self-contained heater 36. Hooked ends 38 of the handle 30 engage ears 40 which are secured to and extend upwardly from the top of the housing 12, to pivotally mount the handle 30 on the housing 12. The cover support pegs 32 are secured to the side wall 24 of the tubular housing 12 adjacent its top, and extend inwardly into the housing to support a cover 42 (see FIGS. 3 and 5), dimensioned to close the top of the housing 12. The cover support pegs 32 are arranged to support the cover 42 just below the top of the housing 12.

The fishing pole supports 34 include diametrically aligned U-shaped plates 44 carried by corresponding cut-outs in the side wall 24 of the housing 12. A positioning peg 46 extends upwardly from the bottom of each of the U-shaped plates 44 and into engagement with the fishing pole 14, in a manner to be described. The diametric alignment of the fishing pole supports 34 is generally perpendicular to the diametric alignment of the ears 40 for convenience in carrying the tip-up ice fishing system 10. The fishing pole supports 34 are further arranged to support the fishing pole 14 below the level at which the cover 42 is supported by the cover support pegs 32, as shown in FIG. 6, so that the fishing pole can be substantially contained within the housing 12 when the cover 42 is in place.

A heater 36 is secured to an interior surface of the housing side wall 24, below the level at which the fishing pole 14 is supported. The heater 36 is preferably a lamp for burning a smokeless petroleum based fuel, or a housed electric bulb adapted for operation off a battery. Other types of heaters, including candles, are within the scope of the present invention. An opening 50 is provided in the side wall 24 of the housing 12, substantially adjacent the heater 36, so that a supply of oxygen is provided to the lamp. To reduce the heat loss through the side wall 24 of the housing 12, the interior surface of the side wall 24 may be coated with a silver colored paint. As is well known, the silver color insulating material tends to reflect the heat back into the housing. The exterior surface 52 of the side wall 24 may be coated with a black coating to absorb heat from the sun, to further enhance the heating capability of the housing 12.

As shown in FIG. 3, the cover 42 is a circular plate dimensioned to close the top of the housing 12. The cover 42 further includes a knob handle 54, a laterally opening slot 56, and a door 58. The slot 56 extends radially from a point at or near the center of the cover 42 to an outer edge. The door 58 is pivotally mounted to the cover 42 adjacent the slot 56 and is dimensioned to close a substantial portion of the slot 56 while leaving a centrally located portion adjacent the innermost edge of the slot 56 uncovered, as indicated at 62.

The housing 12 may be employed, without the fishing pole 14, to prevent freeze over of the fishing hole by positioning the housing 12 within the fishing hole as illustrated in FIG. 1 with the heater 36 actuated and the cover 42 positioned over the top of the housing. The door 58 of the cover 42 should be in the closed position indicated in phantom in FIG. 3, to substantially close the entire top of the housing 12. This configuration may also be used for fishing with a baited fishline being lowered through the central portion 62 of the slot 56 into the fishing hole 18. When a fish bites and is hooked, the door 58 is moved to its open position, so that the cover 42 may be removed from the top of the housing 12, and separated from the fish line 22 extending through the slot 56. Without the door 58 and the slot 56 which extends completely to an outer edge of the cover 42, the cover 42 could not be separated from the fish line 22, making retrieval of the fish awkward.

The housing 12 is preferably employed with the fishing pole 14, as shown in FIGS. 1 and 6. The fishing pole 14 includes a tubular fishing rod 64, a reel 66, a wind vane 68 and the tip-up flag system 16. The reel 66 is secured to an underside 70 of the tubular rod 64 while the tip-up flag system 16 and the wind vane 68 are secured to a top side 72 of the rod 64. Apertures 88 through the tubular rod 64 are adapted for engagement by the pegs 46.

The reel 66 includes the usual spool, fishing line 22 wound around the spool, and a fish hook at one end of the line 22. The reel 66 may be secured to pole 14 in any convenient manner as may one or more line guide(s) 86. A first end 79 of the tubular rod 64 defines a handle 80, and a second end 81 of the tubular rod 64 includes longitudinally extending diametrically aligned slots 82 (both of which are visible in FIG. 6).

The diameter of the openings 88 and the cross sectional dimension of the U-shaped plates 44 are greater than the diameter of the positioning pins 46 and the cross sectional dimension of the tubular rod 64, respectively, so that the tubular rod 64 may be rocked from side to side with respect to the fishing pole supports 34, as indicated by the direction arrow 90 in FIG. 5. This rocking of the tubular rod 64 imparts movement to bait carried by the fish line 22, to attract other fish within the body of water below the layer of ice 20 and is induced by the wind vane 68.

The wind vane 68 includes a strike plate 92 secured to a post 94 having a threaded end 96. The post 94 extends through openings (not shown) adjacent the second end of the tubular rod 64, exterior of the periphery of the housing 12 when the fishing pole 14 is mounted thereon, and is secured to the rod 64 by a nut 98. The openings are aligned substantially perpendicular to the plane of the longitudinally extending slots 82. The resiliency of an upper portion of the tubular rod 64, on opposite sides of the longitudinally extending slots 82, act as a lock washer against the nut 98 to prevent nut 98 from being accidentally loosened. When the tip-up ice fishing system 10 is being transported, the wind vane 68 is removed from the tubular rod 64, and inserted, post 94 first, into the tubular rod 64 for storage, with the strike plate 92 tightly grasped within the slots 82.

The tip-up flag system 16 includes a signal flag 104, and a trigger 106. The signal flag 104 includes a flag 108 secured to a free end of a flagpole 110, the flagpole 110 being flexibly coupled to the tubular rod 64 by a coil spring 112, also at a point exterior of the periphery of the housing 12 when the rod 64 is mounted thereon. The coil spring 112 normally holds the signal flag 104 in a signal position, substantially perpendicular to the tubular rod 64, and permits the signal flag 104 to be bent into a cocked position, aligned substantially parallel to the tubular rod 64. The signal flag 104 is releasably held in the cocked position by the trigger 106 as shown in FIG. 6. An upper tip 114 of the flagpole 110 is curled to prevent injury to individuals using the tip-up ice fishing system 10. This signal flag, when removed from the tubular rod 64, may be stored within the end 79 of the tubular rod 64.

The trigger mechanism 106 includes an angle plate 116 secured by a first leg 118 to the top side 72 of the tubular rod 64. A second leg 120 of the angle plate 116 extends substantially perpendicular to the rod, and includes a laterally opening slot 122, arranged to transversely receive the flagpole 110, when the signal flag 104 is in the cocked position. The resiliency of the coil spring 112 biases the flagpole 110 against a bearing surface 124 defined along one edge of the slot 122.

The tigger mechanism 106 further includes a trip lever 126 which includes a hub 128, a first arm 130 and a second arm 132. The first arm 130 and the second arm 132 extend from the hub 128 in angled relation. The trip lever 126 is pivotally mounted on the second leg 120 of the angle-shaped plate 116, below the laterally opening slot 122, by a bolt 134 and a wing nut 136. A spring may be employed to bias the trip lever 126 into frictional engagement with the second leg 120 of the angle shaped plate 116, in known manner.

The first arm 130 has a hooked end 140 over which the fish line 22 is looped. The trip lever 126 is rotated in response to a predetermined force applied to the fish line 22 (by a fish tugging on the line 22), which force is sufficient to overcome the frictional engagement of the trip lever 126 and the second leg 120 of the angle-shaped plate 116. When the trip lever 126 is rotated, the second arm 132 engages and forces the flagpole 110 from the laterally opening slot 122. Once released from the laterally opening slot 122, the coil spring 112 biases the signal flag 104 back into its signal position, indicating the presence of a fish on the line. Tightening or loosening the wing nut 136 adjusts the tension required on the fish line 22 to rotate the trip lever 126.

The tip-up ice fishing system 10 of the present invention offers many advantages over the prior art. The tapered tubular housing 12 is lightweight and inexpensive to manufacture. The tapered shape of the housing 12 permits it to be self supported within a fish hole. The material coating the interior surface 48 and the exterior surface 52 of the housing 12 reduces heat loss from the housing 36, and maximizes heat absorption from the sun, respectively. The self-contained heater 36 requires little or no monitoring, permits a fish line to be lowered through the housing 12 into the fish hole, and eliminates the ash residue problem experienced by other heated tip-up systems which burn a solid combustible material.

The cover 42 substantially closes the housing 12 to prevent heat loss, while permitting a fish line to be dropped into the fish hole through the housing 12. The pivotally mounted door 58 on the cover 42 faciliates retrieval of a fish by permitting the cover 42 to be separated from the fishing line 22.

The tubular shape of the fishing pole 64 enables the wind vane 68 and the signal flag 104 to be conveniently stored at opposite ends within the tubular rod 64, and can be readily secured on the rod 64 when needed. Because the tip-up flag system 16 is completely carried by the fishing rod 64, the fishing pole 14 can be used independently of the housing 12, when desired. Also, the mounting arrangement of the trip lever 126 enables the tension required to trip the signal flag 104 to be easily adjusted.

The manner in which the fishing pole 14 is mounted on the fishing pole supports 34 securely holds the fishing pole 14 in place, yet permits the fishing pole 14 to be rocked side to side by wind striking the wind vane 68. When the fishing pole 14 is mounted on the housing 12, the reel 66 is supported above the water line of the fishing hole within the heated environment of the housing, so that the reel 66 and the fishing line 22 do not freeze. Further, the tip-up flag system 16 is operable even with the cover 42 in place on top of the housing 12 in that the flag pole remains above the cover as shown in FIG. 6.

Although the present invention has been described with reference to preferred embodiments, workers skilled in the art will recognize that changes may be made in form and detail without departing from the spirit and scope of the invention.

What is claimed is:

1. A device for preventing freeze over of a fishing hole of a desired dimension cut through a layer of ice overlying a body of water, comprising:
   a tapered, housing having an open top and an open bottom, and being smaller in cross-sectional dimension at its bottom than said desired dimension and larger in cross-sectional dimension at its top than said desired dimension, the housing being self-supporting within the fishing hole;
   a self contained heater mounted on an inner surface of a side wall of the housing;
   a cover dimensioned to close the top of the housing, the cover having a slot extending to an edge thereof for passing a fish line through the cover and housing, into the body of water below the layer of ice, and a pivotally mounted door mounted adjacent said slot for movement between a closed position overlying all but a central portion, and an open position exposing the entire slot; and
   an insulating material to reduce the loss of heat, generated by the heater coating the housing and cover.

2. An ice fishing system comprising:
   a fishing pole including a fish line;
   means supporting the fishing pole, at spaced locations along its length, in a horizontal position over an ice fishing hole for allowing the fishing pole to be rocked in a side to side motion with respect to the supporting means to impart movement to bait secured to the fish line; and
   wind vane means secured to the fishing pole for imparting said side to side rocking motion to the fishing pole in response to the action of air currents.

3. A tip-up system for ice fishing, comprising:
   a fishing pole including a rod, a fishing line carried by the rod, a signal flag including a flagpole flexibly coupled to the rod, the flagpole being normally biased in a visible signal position and being resiliently bendable to a cocked position, means for releasably holding the signal flag in the cocked position, and trigger means for disengaging the signal flag from the means for releasably holding upon application of a predetermined force on the fish line, so that the signal flag is free to return to its signal position to indicate the presence of a fish biting at the fishing line; and means for supporting the fishing pole in a horizontal orientation while allowing the fishing line to be lowered into a fishing hole cut into a layer of ice overlying a body of water including a tapered housing having an open top and an open bottom, the housing narrowing in cross sectional dimension from its top to its bottom so that the housing is self-supported within a fishing hole having a cross sectional dimension smaller than the cross-sectional dimension of the top of the housing and the housing further having a side wall arranged with diametrically aligned support surfaces for supporting the fishing pole, and the means for holding the signal flag in its cocked position being an angle-shaped plate secured to the fishing rod by a first leg, and having a second leg arranged with a laterally opening slot for transversely receiving the flagpole.

4. The tip-up system of claim 3 wherein the trigger means includes a trip lever pivotally mounted on the angle-shaped plate, the trip lever having a first arm arranged to engage the fish line, so that application of a preselected force on the fish line causes rotation of the trip lever, and having a second arm arranged to force the flagpole from the laterally opening slot upon rotation of the trip lever, so that the signal flag is free to return to its normal signal position.

5. The tip-up system of claim 4 wherein the trigger means further includes means for adjusting the preselected force which is require to rotate the trip lever.

6. The tip-up system of claim 5 wherein:
the flagpole is secured to the fishing rod at a point which is outside the periphery of the housing, when the rod is mounted on the housing; and further comprising:
a cover for the housing, the cover having an opening therein through which the second leg of the angle-shaped plate extends to engage the signal flag, when the cover is in closing relation with the housing.

7. The tip-up system of claim 6 wherein the opening in the cover is a slot radially extending generally from the center of the cover to one edge of the cover, the cover further including a door pivotally mounted adjacent one edge of the slot and movable between an open position exposing the entire slot and a closed position closing all but a portion of the slot adjacent the center of the cover.

8. The tip-up system of claim 7 further comprising wind vane means secured to the fishing rod, externally of the periphery of the housing when the fishing rod is mounted thereon, for imparting motion to bait carried by the fishline via the fishing rod, in response to air currents.

9. The ice fishing system of claim 2 wherein said supporting means comprises spaced, U-shaped suport means larger than the cross sectionof said fishing pole, said fishing pole resting within said support means.

10. The ice fishing system of claim 9 wherein said supporting means further comprises pegs engaging said fishing pole within said spaced, U-shaped support means while permitting said side to side rocking motion.

* * * * *